US011612161B1

(12) United States Patent
Chen

(10) Patent No.: US 11,612,161 B1
(45) Date of Patent: Mar. 28, 2023

(54) DUAL-PURPOSE MOSQUITO REPELLER FOR A MOSQUITO-REPELLENT INCENSE TABLET AND A MOSQUITO-REPELLENT INCENSE LIQUID

(71) Applicant: ShenZhen Weiguantong Industry Co., Ltd., Guangdong (CN)

(72) Inventor: Mainan Chen, Guangdong (CN)

(73) Assignee: ShenZhen Weiguantong Industry Co., Ltd., Shenzhen (CN)

( * ) Notice: Subject to any disclaimer, the term of this patent is extended or adjusted under 35 U.S.C. 154(b) by 0 days.

(21) Appl. No.: 17/829,323

(22) Filed: May 31, 2022

(30) Foreign Application Priority Data

Dec. 24, 2021 (CN) .......................... 202123303375.X

(51) Int. Cl.
*A01M 29/12* (2011.01)
*H02J 7/00* (2006.01)
*A01P 17/00* (2006.01)
*A01N 25/18* (2006.01)

(52) U.S. Cl.
CPC ............. *A01M 29/12* (2013.01); *A01N 25/18* (2013.01); *A01P 17/00* (2021.08); *H02J 7/0045* (2013.01); *H02J 7/0048* (2020.01)

(58) Field of Classification Search
CPC ................................ A01M 29/12; A01M 1/20
USPC ..... 43/125, 129, 132.1, 124; 239/34, 44, 53, 239/55, 60; 219/200, 201, 386, 390, 394, 219/395; 261/75, 119.1
See application file for complete search history.

(56) References Cited

U.S. PATENT DOCUMENTS

| 5,575,992 | A | * | 11/1996 | Kunze | ..................... A61L 9/012 516/926 |
| 6,050,551 | A | * | 4/2000 | Anderson | ............... A61L 9/122 261/DIG. 65 |
| 6,078,728 | A | * | 6/2000 | O'Rourke | ........... A01M 1/2077 392/390 |
| 6,249,645 | B1 | * | 6/2001 | Smith | ...................... A61L 9/03 392/390 |

(Continued)

*Primary Examiner* — Darren W Ark
*Assistant Examiner* — Kevin M Dennis
(74) *Attorney, Agent, or Firm* — Dragon Sun Law Firm, PC; Jinggao Li; Nathaniel Perkins

(57) ABSTRACT

The present disclosure provides a dual-purpose mosquito repeller for a mosquito-repellent incense tablet and a mosquito-repellent incense liquid, including: a mosquito repeller body. The mosquito repeller body includes: a mosquito-repellent incense tablet heating unit, configured to heat the mosquito-repellent incense tablet to produce a mosquito-repellent smoke; a mosquito-repellent incense liquid heating unit, configured to heat the mosquito-repellent incense liquid to produce a mosquito-repellent smoke. A level switch for switching the mosquito repeller to a different working state is disposed between the mosquito-repellent incense tablet heating unit and the mosquito-repellent incense liquid heating unit. Each level of the level switch corresponds to one working state. Each working state corresponds to an individually-powered-on working state of the mosquito-repellent incense tablet heating unit/the mosquito-repellent incense liquid heating unit, or corresponds to a simultaneously-powered-on working state of the mosquito-repellent incense tablet heating unit/the mosquito-repellent incense liquid heating unit.

6 Claims, 3 Drawing Sheets

(56) References Cited

U.S. PATENT DOCUMENTS

| | | | | |
|---|---|---|---|---|
| 6,349,168 B1* | 2/2002 | Jaworski | ............ | A01M 1/2077 |
| | | | | 392/390 |
| 6,374,045 B2* | 4/2002 | Basaganas Millan | .... | A61L 9/03 |
| | | | | 392/391 |
| 6,487,367 B2* | 11/2002 | Vieira | ................ | A61L 9/037 |
| | | | | 392/395 |
| 7,190,888 B2* | 3/2007 | Wolf | ................ | A01M 1/2077 |
| | | | | 392/386 |
| 7,249,719 B2* | 7/2007 | He | ................ | A61L 9/035 |
| | | | | 239/45 |
| RE40,464 E* | 8/2008 | Vieira | ................ | A61L 9/037 |
| | | | | 219/486 |
| 7,622,134 B2* | 11/2009 | Davis | ................ | A61L 9/127 |
| | | | | 424/DIG. 10 |
| 7,625,578 B2* | 12/2009 | Davis | ................ | A61L 9/03 |
| | | | | 424/DIG. 10 |
| RE44,312 E* | 6/2013 | Vieira | ................ | A01M 1/2077 |
| | | | | 219/486 |
| 9,827,343 B2* | 11/2017 | Lima | ................ | A61L 9/037 |
| 10,799,838 B1* | 10/2020 | Brookins | ................ | B05B 15/16 |
| 11,134,672 B1* | 10/2021 | Warren | ................ | H02J 7/35 |
| 2016/0255828 A1* | 9/2016 | Cestino | ................ | G01S 19/42 |
| 2019/0093876 A1* | 3/2019 | Proeber | ................ | F21V 23/04 |
| 2019/0167336 A1* | 6/2019 | Liu | ................ | A61B 18/06 |
| 2021/0076660 A1* | 3/2021 | Rubel | ................ | A01M 29/12 |
| 2021/0259459 A1* | 8/2021 | Gonzalez | ............ | A47J 36/2483 |

* cited by examiner

DUAL-PURPOSE MOSQUITO REPELLER FOR A MOSQUITO-REPELLENT INCENSE TABLET AND A MOSQUITO-REPELLENT INCENSE LIQUID

CROSS-REFERENCE TO RELATED APPLICATION

This application claims priority from the Chinese patent application 202123303375X filed Dec. 24, 2021, the content of which is incorporated herein in the entirety by reference.

TECHNICAL FIELD

The present disclosure relates to the technical field of mosquito repellers and in particular to a dual-purpose mosquito repeller for a mosquito-repellent incense tablet and a mosquito-repellent incense liquid

BACKGROUND

At present, mosquito repeller is a common and widely used household mosquito repellent tool. Mosquito repeller can repel or kill mosquitoes and is typically either a mosquito-repellent incense tablet that is heated to give off a mosquito-repellent smoke or a mosquito-repellent incense liquid that is evaporated to give off a mosquito-repellent smoke. Conventionally, mosquito repeller gives off a mosquito-repellent smoke by only heating a mosquito-repellent incense tablet or only evaporating a mosquito-repellent incense liquid, achieving a single, insufficient effect and resulting in a poor user experience.

SUMMARY

In view of the foregoing, in order to solve the above technical problems, it is necessary to provide a dual-purpose mosquito repeller for a mosquito-repellent incense tablet and a mosquito-repellent incense liquid to solve the following problems of conventional solutions: existing mosquito repeller produces a mosquito-repellent smoke by only heating a mosquito-repellent incense tablet or only evaporating a mosquito-repellent incense liquid, leading to single and insufficient effect.

The present disclosure adopts the following technical solution:

There is provided a dual-purpose mosquito repeller for a mosquito-repellent incense tablet and a mosquito-repellent incense liquid, including a mosquito repeller body. The mosquito repeller body includes: a mosquito-repellent incense tablet heating unit, disposed inside the mosquito repeller body to heat the mosquito-repellent incense tablet to produce a mosquito-repellent smoke; a mosquito-repellent incense liquid heating unit, disposed inside the mosquito repeller body to heat the mosquito-repellent incense liquid to produce a mosquito-repellent smoke. A level switch for switching the mosquito repeller to a different working state is disposed between the mosquito-repellent incense tablet heating unit and the mosquito-repellent incense liquid heating unit, and each level of the level switch corresponds to one working state. Each working state corresponds to an individually-powered-on working state of the mosquito-repellent incense tablet heating unit/the mosquito-repellent incense liquid heating unit, or corresponds to a simultaneously-powered-on working state of the mosquito-repellent incense tablet heating unit/the mosquito-repellent incense liquid heating unit, or corresponds to a simultaneously-powered-off state of the mosquito-repellent incense tablet heating unit/the mosquito-repellent incense liquid heating unit.

Optionally, the mosquito-repellent incense tablet heating unit includes a mosquito-repellent incense tablet heating sheet and a mosquito-repellent incense tablet placement structure on the mosquito-repellent incense tablet heating sheet, and the level switch is in electrical connection with the mosquito-repellent incense tablet heating sheet.

Optionally, the mosquito-repellent incense liquid heating unit includes a mosquito-repellent incense liquid heating body, a mosquito-repellent incense liquid placement container and a mosquito-repellent incense liquid sucking rod, where the mosquito-repellent incense liquid heating body includes an annular heating sheet. One end of the mosquito-repellent incense liquid sucking rod is inserted into the mosquito-repellent incense liquid placement container, and the other end of the mosquito-repellent incense liquid sucking rod is inserted into the annular heating sheet and spaced apart from the annular heating sheet. The level switch is in electrical connection with the mosquito-repellent incense liquid heating body.

Optionally, the mosquito repeller body is provided with a mosquito repeller chargeable power supply and a power switch, the power switch is in electrical connection with the mosquito repeller chargeable power supply, and the level switch is in electrical connection with the power switch.

Optionally, the power switch and the level switch are disposed on a surface of the mosquito repeller body in a spacing, the power switch is a toggle switch or a button switch long-pressed to be turned on/off, and the level switch is a button switch long-pressed to be turned on/off.

Optionally, the mosquito repeller body is provided with a power indicator lamp corresponding to the power switch and a level indicator lamp corresponding to the level switch. The power indicator lamp and the level indicator lamp are turned on and off independent of each other. The mosquito repeller chargeable power supply is a chargeable battery disposed inside the mosquito repeller body, and the chargeable battery is provided with a corresponding battery charging interface. A battery interface hole for placing the battery charging interface is disposed on the surface of the mosquito repeller body.

Optionally, the mosquito repeller body includes a mosquito repeller base, an integrally-formed intermediate mold and a mosquito repeller top cap. The mosquito repeller base and the mosquito repeller top cap are combined together by a fitting structure or a helical structure. The intermediate mold is disposed inside the mosquito repeller base and the mosquito repeller top cap.

Optionally, a heat dissipation structure is disposed on the mosquito repeller top cap and in communication with the mosquito-repellent incense tablet heating unit and the mosquito-repellent incense liquid heating unit.

Optionally, the mosquito repeller base and the mosquito repeller top cap are made of a heat-resistant material, and an anti-hand-slip structure is disposed on outer surfaces of the mosquito repeller base and the mosquito repeller top cap.

Optionally, the intermediate mold is placed in the mosquito repeller base, the mosquito repeller chargeable power supply, the mosquito-repellent incense tablet heating unit, the mosquito-repellent incense liquid heating unit and the level switch are all combined in the intermediate mold, and the mosquito repeller top cap is respectively provided with a power switch hole for placing the power switch and a level switch hole for placing the level switch.

The embodiments of the present disclosure have the following beneficial effects:

In the dual-purpose mosquito repeller of the mosquito-repellent incense tablet and the mosquito-repellent incense liquid according to the present disclosure, the mosquito-repellent incense tablet heating unit for heating the mosquito-repellent incense tablet to produce a mosquito-repellent smoke and the mosquito-repellent incense liquid heating unit for heating the mosquito-repellent incense liquid to produce a mosquito-repellent smoke are disposed at the same time, and the level switch for switching the mosquito repeller to a different working state is disposed between the mosquito-repellent incense tablet heating unit and the mosquito-repellent incense liquid heating unit, where each level of the level switch corresponds to one working state. In this way, one of the mosquito-repellent incense tablet and the mosquito-repellent incense liquid can be heated or the mosquito-repellent incense tablet and the mosquito-repellent incense liquid can be heated simultaneously, so as to produce a mosquito-repellent smoke with enhanced efficacy and improving user experience.

BRIEF DESCRIPTIONS OF THE DRAWINGS

In order to more clearly describe the technical solutions of the embodiments of the present disclosure or the prior art, the accompanying drawings required for descriptions of the embodiments or the prior art will be briefly introduced below. The drawings described below are only some embodiments of the present disclosure, and those skilled in the art may obtain other drawings based on these drawings without making creative work.

DETAILED DESCRIPTIONS OF EMBODIMENTS

The technical solutions of the embodiments of the present disclosure will be fully and clearly described in combination with the accompanying drawings in the embodiments of the present disclosure. Apparently, the described embodiments are merely some embodiments of the present disclosure rather than all embodiments. All other embodiments obtained by those skilled in the art based on these embodiments of the present disclosure without making creative work shall all fall within the scope of protection of the present disclosure.

Figure 1:
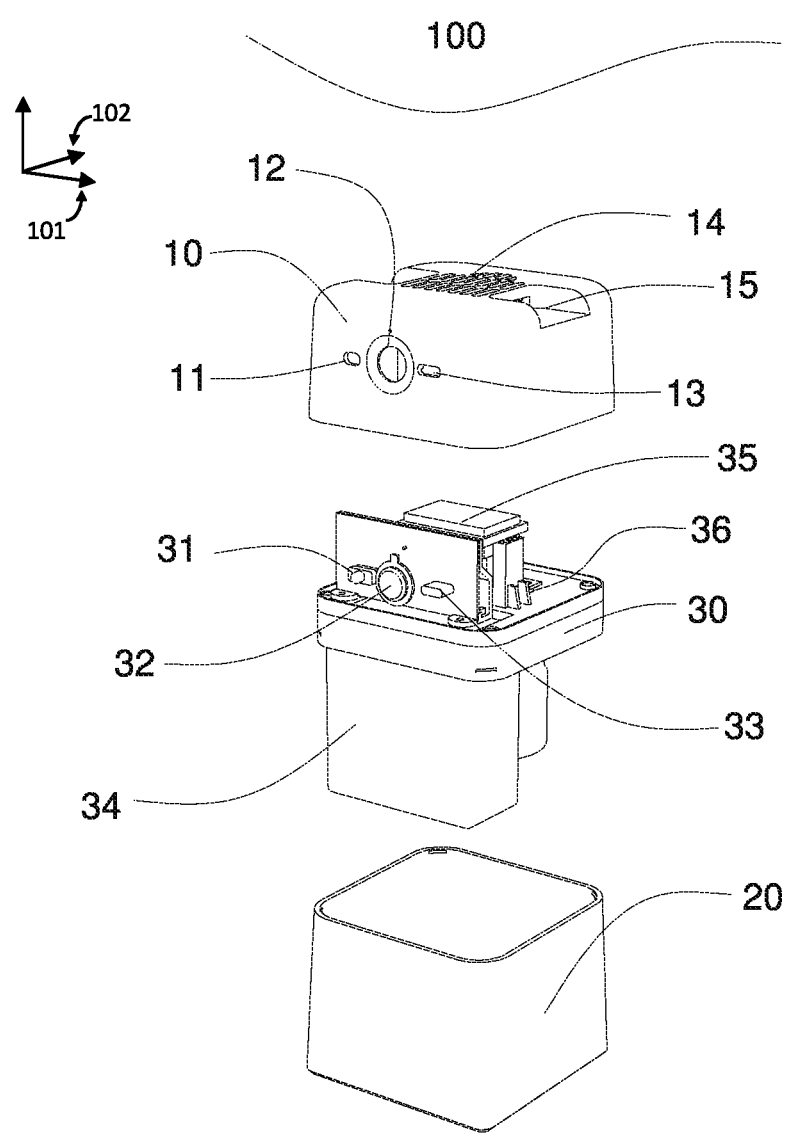
FIG. 1 is an exploded view illustrating a dual-purpose mosquito repeller for a mosquito-repellent incense tablet and a mosquito-repellent incense liquid according to an embodiment of the present disclosure.
Figure 2:
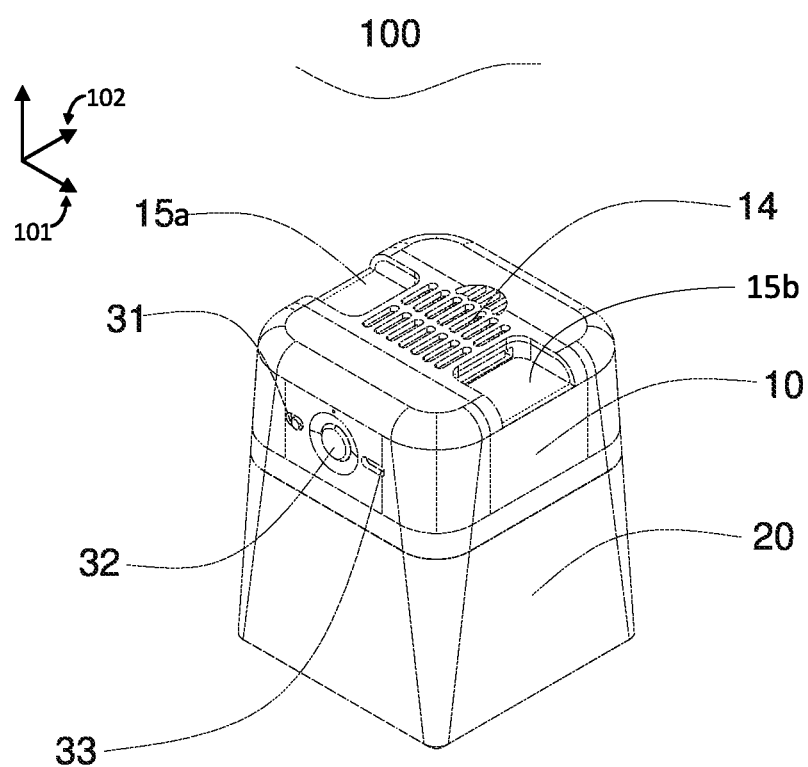
FIG. 2 is a is an external view illustrating an entire structure of a dual-purpose mosquito repeller for a mosquito-repellent incense tablet and a mosquito-repellent incense liquid according to an embodiment of the present disclosure.
Figure 3:
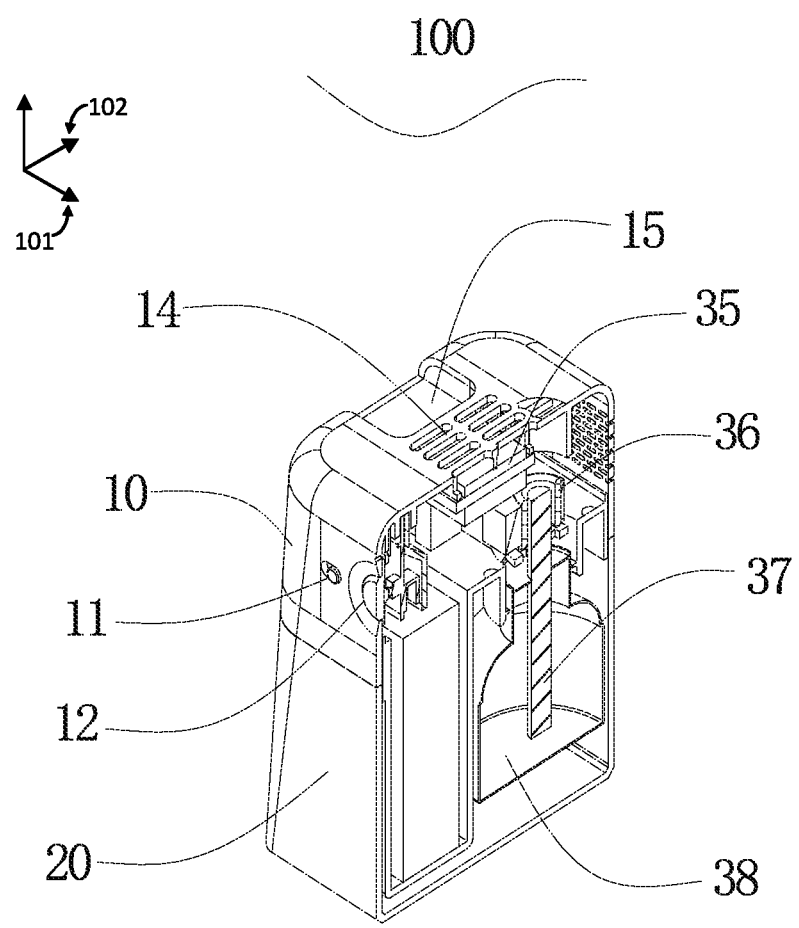
FIG. 3 is an entirely vertical sectional schematic diagram illustrating a dual-purpose mosquito repeller for a mosquito-repellent incense tablet and a mosquito-repellent incense liquid according to an embodiment of the present disclosure.

With reference to FIGS. 1 to 3, a dual-purpose mosquito repeller for a mosquito-repellent incense tablet and a mosquito-repellent incense liquid in an embodiment may be obtained and may include a mosquito repeller body 100. The mosquito repeller body 100 includes:

a mosquito-repellent incense tablet heating unit, disposed inside the mosquito repeller body 100 to heat the mosquito-repellent incense tablet to produce a mosquito-repellent smoke; and a mosquito-repellent incense liquid heating unit, disposed inside the mosquito repeller body 100 to heat the mosquito-repellent incense liquid to produce a mosquito-repellent smoke.

A level switch 32 for switching the mosquito repeller to a different working state is disposed between the mosquito-repellent incense tablet heating unit and the mosquito-repellent incense liquid heating unit. Each level of the level switch 32 corresponds to one working state. Each working state corresponds to an individually-powered-on working state of the mosquito-repellent incense tablet heating unit/ the mosquito-repellent incense liquid heating unit, or corresponds to a simultaneously-powered-on working state of the mosquito-repellent incense tablet heating unit/the mosquito-repellent incense liquid heating unit, or corresponds to a simultaneously-powered-off state of the mosquito-repellent incense tablet heating unit/the mosquito-repellent incense liquid heating unit.

Optionally, the level switch may be long-pressed to a first level corresponding to an individually-heated state of a mosquito-repellent incense tablet heating sheet 35, long-pressed to a second level corresponding to an individually-heated state of a mosquito-repellent incense liquid heating body 36, long-pressed to a third level corresponding to a simultaneously-heated state of the mosquito-repellent incense tablet heating sheet 35 and the mosquito-repellent incense liquid heating body 36, and long-pressed to a fourth level corresponding to a simultaneously-powered-off state of the mosquito-repellent incense tablet heating sheet 35 and the mosquito-repellent incense liquid heating body 36.

In the present embodiment, optionally, the mosquito-repellent incense tablet heating unit includes the mosquito-repellent incense tablet heating sheet 35 and a mosquito-repellent incense tablet placement structure 15 on the mosquito-repellent incense tablet heating sheet 35, and the level switch 32 is in electrical connection with the mosquito-repellent incense tablet heating sheet 35.

In the present embodiment, optionally, the mosquito-repellent incense liquid heating unit includes the mosquito-repellent incense liquid heating body 36, a mosquito-repellent incense liquid placement container 38 and a mosquito-repellent incense liquid sucking rod 37. The mosquito-repellent incense liquid heating body 36 includes an annular heating sheet. One end of the mosquito-repellent incense liquid sucking rod 37 is inserted into the mosquito-repellent incense liquid placement container 38, and the other end of the mosquito-repellent incense liquid sucking rod 37 is inserted into the annular heating sheet and spaced apart from the annular heating sheet. The level switch 32 is in electrical connection with the mosquito-repellent incense liquid heating body 36.

In the present embodiment, optionally, the mosquito repeller body 100 is provided with a mosquito repeller chargeable power supply 34 and a power switch 31, the power switch 31 is in electrical connection with the mosquito repeller chargeable power supply 34, and the level switch 32 is in electrical connection with the power switch 31.

In the present embodiment, optionally, the power switch 31 and the level switch 32 are disposed on a surface of the mosquito repeller body 100 in a spacing, the power switch 31 is a toggle switch or a button switch long-pressed to be turned on/off, and the level switch 32 is a button switch long-pressed to be turned on/off.

The level switch 32 may be disposed as a button switch long-pressed to be turned on/off, so as to provide better guarantee for preventing the mosquito repeller from being easily turned on. Optionally, when the level switch 32 is long-pressed for a time length greater than a first time length and less than a second time length, the level switch 32 is turned on; when the level switch 32 is long-pressed for a time length greater than the second time length, the level switch 32 is turned off.

In the present embodiment, optionally, the mosquito repeller body 100 is provided with a power indicator lamp (not shown) corresponding to the power switch 31 and a level indicator lamp (not shown) corresponding to the level switch 32. The power indicator lamp and the level indicator lamp are turned on and off independent of each other. The mosquito repeller chargeable power supply 34 is a chargeable battery disposed inside the mosquito repeller body 100, the chargeable battery is provided with a corresponding battery charging interface 33, and a battery interface hole 13 for placing the battery charging interface 33 is disposed on the surface of the mosquito repeller body 100. The power indicator lamp and the level indicator lamp can help a user to determine a status of each switch and may also provide lighting at night. Further, the power indicator lamp and the level indicator lamp both can be turned off.

In the present embodiment, optionally, the mosquito repeller body 100 includes a mosquito repeller base 20, an integrally-formed intermediate mold 30 and a mosquito repeller top cap 10. The mosquito repeller base 20 and the mosquito repeller top cap 10 are combined together by a fitting structure or a helical structure, and the intermediate mold 30 is disposed inside the mosquito repeller base 20 and the mosquito repeller top cap 10. Further, the intermediate mold is provided with a circuit board (not shown).

In the present embodiment, optionally, a heat dissipation structure 14 is disposed on the mosquito repeller top cap 10 and in communication with the mosquito-repellent incense tablet heating unit and the mosquito-repellent incense liquid heating unit.

The heat dissipation structure 14 may be a grid structure or another structure. The mosquito-repellent incense tablet heating unit, the mosquito-repellent incense liquid heating unit and the heat dissipation structure 14 are mutually spaced. The heat generated by the mosquito-repellent incense electric heating structure may be dissipated out by the heat dissipation structure 14.

In the present embodiment, optionally, the mosquito repeller base 20 and the mosquito repeller top cap 10 are made of a heat-resistant material, and an anti-hand-slip structure (not shown) is disposed on outer surfaces of the mosquito repeller base 20 and the mosquito repeller top cap 10.

The heat-resistant material may prevent melting caused by the heat generation by the mosquito-repellent incense tablet heating unit and the mosquito-repellent incense liquid heating unit, and the anti-hand-slip structure may prevent the user's hand from slipping when the user moves the mosquito repeller by hand.

In the present embodiment, optionally, the intermediate mold 30 is placed in the mosquito repeller base 20, the mosquito repeller chargeable power supply 34, the mosquito-repellent incense tablet heating unit, the mosquito-repellent incense liquid heating unit and the level switch 32 are all combined in the intermediate mold 30, and the mosquito repeller top cap 10 is respectively provided with a power switch hole 11 for placing the power switch 31 and a level switch hole 12 for placing the level switch 32.

The power switch hole 11, the level switch hole 12 and the battery interface hole 13 are disposed in a spacing side by side to facilitate use of a user. The mosquito repeller chargeable power supply 34 is a chargeable battery which may be easily charged by a user. Therefore, the user does not need to worry about the power level even in a case of outdoor use.

In the present embodiment, optionally, a plurality of support legs (not shown) contacting with the ground are disposed on a bottom surface of the mosquito repeller body 100, such that the support legs can help stabilize the mosquito repeller body 100 on the ground.

In the dual-purpose mosquito repeller of the mosquito-repellent incense tablet and the mosquito-repellent incense liquid according to the present disclosure, the mosquito-repellent incense tablet heating unit for heating the mosquito-repellent incense tablet to produce a mosquito-repellent smoke and the mosquito-repellent incense liquid heating unit for heating the mosquito-repellent incense liquid to produce a mosquito-repellent smoke are disposed at the same time, and the level switch 32 for switching the mosquito repeller to a different working state is disposed between the mosquito-repellent incense tablet heating unit and the mosquito-repellent incense liquid heating unit, where each level of the level switch 32 corresponds to one working state. In this way, one of the mosquito-repellent incense tablet and the mosquito-repellent incense liquid can be heated or the mosquito-repellent incense tablet and the mosquito-repellent incense liquid can be heated simultaneously, so as to produce a mosquito-repellent smoke, achieving good effect and improving the use experiences of users.

In the present embodiment, optionally, the dual-purpose mosquito repeller 100 includes a power switch hole 11, a level switch hole 12 and a battery interface hole 13 disposed on a side wall of the mosquito repeller top cap 10 along a first direction 101. Further, the dual-purpose mosquito repeller 100 includes a mosquito-repellent incense tablet heating unit including a mosquito-repellent incense tablet heating sheet 35, a first mosquito-repellent incense tablet placement structure 15, a second mosquito-repellent incense tablet placement structure 15, and a heat dissipation structure 14 disposed inside the mosquito repeller body to heat the mosquito-repellent incense tablet to produce a mosquito-repellent smoke, wherein the first mosquito-repellent incense tablet placement structure 15 and the second mosquito-repellent incense tablet placement structure 15 are disposed on two sides of the heat dissipation structure 14 along the first direction 101. Further the heat dissipation structure 14 includes a first row and a second row each orientated in the first direction 101, each row including a plurality of grids, each grid orientated in a second direction 102 perpendicular or substantially perpendicular to the first direction, and the heat dissipation structure is disposed on a center of the mosquito repeller top cap 10 and in communication with the mosquito-repellent incense tablet heating unit and the mosquito-repellent incense liquid heating unit.

The above disclosure is only some preferred embodiments of the present disclosure and thus the scope of protection of the present disclosure is not limited thereto. Therefore, equivalent changes made based on the claims of the present disclosure still fall within the scope of protection of the present disclosure.

What is claimed is:

1. A dual-purpose mosquito repeller for a mosquito-repellent incense tablet and a mosquito-repellent incense liquid, comprising:
    a mosquito repeller body, wherein the mosquito repeller body comprises:
        a mosquito repeller base;

an integrally-formed intermediate mold placed on top of the mosquito repeller base;

a mosquito repeller top cap comprising a power switch hole for placing a power switch, a level switch hole for placing a level switch and a battery interface hole for placing a battery charging interface, wherein the power switch hole, the level switch hole and the battery interface hole are disposed on a side wall of the mosquito repeller top cap along a first direction;

a mosquito-repellent incense tablet heating unit comprising a mosquito-repellent incense tablet heating sheet, a first mosquito-repellent incense tablet placement structure, a second mosquito-repellent incense tablet placement structure, and a heat dissipation structure disposed inside the mosquito repeller body to heat the mosquito-repellent incense tablet to produce a mosquito-repellent smoke, wherein the first mosquito-repellent incense tablet placement structure and the second mosquito-repellent incense tablet placement structure are disposed on two sides of the heat dissipation structure along the first direction; and a mosquito-repellent incense liquid heating unit comprising a mosquito-repellent incense liquid heating body, a mosquito-repellent incense liquid placement container and a mosquito-repellent incense liquid sucking rod, disposed inside the mosquito repeller body to heat the mosquito-repellent incense liquid to produce a mosquito-repellent smoke, wherein the mosquito-repellent incense liquid heating body comprises an annular heating sheet; one end of the mosquito-repellent incense liquid sucking rod is inserted into the mosquito-repellent incense liquid placement container, extended from a bottom surface of the mosquito-repellent incense liquid placement container and passes through a center of a top cover of the mosquito-repellent incense liquid placement container, and another end of the mosquito-repellent incense liquid sucking rod is inserted into the annular heating sheet and spaced apart from the annular heating sheet;

wherein a mosquito repeller chargeable power supply, the mosquito-repellent incense tablet heating unit, the mosquito-repellent incense liquid heating unit and the level switch are all combined in the intermediate mold;

wherein the level switch is configured to have a first level corresponding to an individually-heated state of a mosquito-repellent incense tablet heating sheet, a second level corresponding to an individually-heated state of a mosquito-repellent incense liquid heating body, a third level corresponding to a simultaneously-heated state of the mosquito-repellent incense tablet heating sheet and the mosquito-repellent incense liquid heating body, and a fourth level corresponding to a simultaneously-powered-off state of the mosquito-repellent incense tablet heating sheet and the mosquito-repellent incense liquid heating body;

the level switch is in electrical connection with the mosquito-repellent incense tablet heating sheet; and the mosquito repeller base and the mosquito repeller top cap are combined by a fitting structure or a helical structure, and the intermediate mold is disposed inside the mosquito repeller base and the mosquito repeller top cap.

2. The dual-purpose mosquito repeller of the mosquito-repellent incense tablet and the mosquito-repellent incense liquid according to claim 1, wherein the power switch and the level switch are disposed on a surface of the mosquito repeller body in a spacing, the power switch is a toggle switch or a button switch long-pressed to be turned on or off, and the level switch is a button switch long-pressed to be turned on or off.

3. The dual-purpose mosquito repeller of the mosquito-repellent incense tablet and the mosquito-repellent incense liquid according to claim 1, wherein the mosquito repeller body is provided with a power indicator lamp corresponding to the power switch and a level indicator lamp corresponding to the level switch, the power indicator lamp and the level indicator lamp are turned on and off independent of each other, the mosquito repeller chargeable power supply is a chargeable battery disposed inside the mosquito repeller body, the chargeable battery is provided with the corresponding battery charging interface, and the battery interface hole for placing the battery charging interface is disposed on a surface of the mosquito repeller body.

4. The dual-purpose mosquito repeller of the mosquito-repellent incense tablet and the mosquito-repellent incense liquid according to claim 1, wherein the heat dissipation structure comprises a first row and a second row each orientated in the first direction, each row comprising a plurality of grids, each grid orientated in a second direction perpendicular or substantially perpendicular to the first direction, and the heat dissipation structure is disposed on a center of the mosquito repeller top cap and in communication with the mosquito-repellent incense tablet heating unit and the mosquito-repellent incense liquid heating unit.

5. The dual-purpose mosquito repeller of the mosquito-repellent incense tablet and the mosquito-repellent incense liquid according to claim 1, wherein the mosquito repeller base and the mosquito repeller top cap are made of a heat-resistant material, and an anti-hand-slip structure is disposed on outer surfaces of the mosquito repeller base and the mosquito repeller top cap.

6. The dual-purpose mosquito repeller of the mosquito-repellent incense tablet and the mosquito-repellent incense liquid according to claim 1, wherein the intermediate mold is placed in the mosquito repeller base, the mosquito repeller chargeable power supply, the mosquito-repellent incense tablet heating unit, the mosquito-repellent incense liquid heating unit and the level switch are all combined in the intermediate mold.

* * * * *